(12) United States Patent
Kim et al.

(10) Patent No.: US 9,104,031 B2
(45) Date of Patent: Aug. 11, 2015

(54) ACTIVE OPTICAL DEVICE AND DISPLAY APPARATUS INCLUDING THE SAME

(75) Inventors: Sun-il Kim, Seoul (KR); Jun-hee Choi, Seongnam-si (KR)

(73) Assignee: SAMSUNG ELECTRONICS CO., LTD., Suwin-si (KR)

( * ) Notice: Subject to any disclaimer, the term of this patent is extended or adjusted under 35 U.S.C. 154(b) by 300 days.

(21) Appl. No.: 13/482,333

(22) Filed: May 29, 2012

(65) Prior Publication Data

US 2013/0135709 A1 May 30, 2013

(30) Foreign Application Priority Data

Nov. 24, 2011 (KR) .................. 10-2011-0123667

(51) Int. Cl.
| | | |
|---|---|---|
| *G02F 1/33* | (2006.01) | |
| *G02B 27/22* | (2006.01) | |
| *G02F 1/29* | (2006.01) | |
| G02F 1/03 | (2006.01) | |
| G02F 1/1343 | (2006.01) | |

(52) U.S. Cl.
CPC ........ *G02B 27/22* (2013.01); *G02F 1/29* (2013.01); *G02F 1/0338* (2013.01); *G02F 1/134309* (2013.01); *G02F 2203/10* (2013.01); *G02F 2203/50* (2013.01)

(58) Field of Classification Search
CPC . G02B 27/22; G02F 1/0338; G02F 1/134309; G02F 1/29; G02F 2203/10; G02F 2203/50
USPC .................................................. 359/315–316
See application file for complete search history.

(56) References Cited

U.S. PATENT DOCUMENTS

| 5,559,621 | A | 9/1996 | Minato et al. |
|---|---|---|---|
| 5,654,782 | A | 8/1997 | Morokawa et al. |
| 7,564,610 | B2 * | 7/2009 | Fujimori ............. 359/245 |
| 2003/0098945 | A1 * | 5/2003 | Sugimoto et al. ...... 349/172 |
| 2003/0189538 | A1 * | 10/2003 | Ide ..................... 345/87 |
| 2006/0176542 | A1 | 8/2006 | Muro et al. |
| 2006/0273284 | A1 * | 12/2006 | Hirose ............. 252/299.61 |
| 2010/0296013 | A1 * | 11/2010 | Hung et al. .......... 349/33 |

FOREIGN PATENT DOCUMENTS

| JP | 2008-256750 A | 10/2008 |
|---|---|---|
| JP | 2010-008770 A | 1/2010 |
| KR | 10-2006-0134044 A | 12/2006 |

OTHER PUBLICATIONS

Young Chul Jun, et al., "Plasmonic beaming and active control over fluorescent emission", Nature Communications, DOI: 10.1038/ncomms1286, Published Apr. 19, 2011, pp. 1-6.

* cited by examiner

*Primary Examiner* — Thomas K Pham
*Assistant Examiner* — Vipin Patel
(74) *Attorney, Agent, or Firm* — Sughrue Mion, PLLC

(57) ABSTRACT

An active optical device and a display apparatus including the same are provided. The active optical device includes: first to third electrodes that are sequentially disposed spaced apart from one another; a first refractive index change layer disposed between the first electrode and the second electrode and in which a refractive index is changed by an electric field; and a second refractive index change layer disposed between the second electrode and the third electrode and in which a refractive index is changed by an electric field.

16 Claims, 3 Drawing Sheets

ACTIVE OPTICAL DEVICE AND DISPLAY APPARATUS INCLUDING THE SAME

CROSS-REFERENCE TO RELATED APPLICATIONS

This application claims priority from Korean Patent Application No. 10-2011-0123667, filed on Nov. 24, 2011, in the Korean Intellectual Property Office, the disclosure of which is incorporated herein in its entirety by reference.

BACKGROUND

1. Field

Apparatuses consistent with exemplary embodiments relate to an active optical device in which phase modulation may be easily performed.

2. Description of the Related Art

Optical devices, such as a lens, a mirror, and a prism, are variously used to change a path of light in optical systems. In general, when light passes through an optical device, a phase velocity of the light is changed. The phase velocity is determined by a refractive index of a material. Accordingly, a phase of light is changed by the refractive index, and thus, a path of the light is changed. Based on such a principle, if a shape of a material having the same refractive index changes, a traveling speed of light at each part of the material changes, and thus, a traveling direction of the light changes.

If a refractive index is different for each pixel, a path of light may be easily controlled. Since the path of light may be controlled, new optical characteristics, which may not be obtained in a general optical device, such as a lens, may be obtained. A representative example thereof is a hologram.

An existing optical device that modulates a phase uses a liquid crystal (LC) material. However, in the liquid crystal, if an interval between pixels is decreased, an electric field distribution of an area far away from an electrode is decreased. Accordingly, it is difficult to increase a degree of change in a refractive index of the liquid crystal. Thus, research has been conducted into the development of an active optical device that has high resolution and in which phase modulation may be easily performed.

SUMMARY

One or more exemplary embodiments provide an active optical device capable of increasing a light phase difference between refractive index change layers.

Additional aspects will be set forth in part in the description which follows and, in part, will be apparent from the description, or may be learned by practice of the exemplary embodiments.

According to an aspect of an exemplary embodiment, an active optical device includes first to third electrodes that are sequentially disposed spaced apart from one another; a first refractive index change layer disposed between the first electrode and the second electrode and in which a refractive index is changed by an electric field; and a second refractive index change layer disposed between the second electrode and the third electrode and in which a refractive index is changed by an electric field.

If a first voltage is applied between the first electrode and the second electrode, the refractive index of the first refractive index change layer changes, and if a second voltage is applied between the second electrode and the third electrode, the refractive index of the second refractive index change layer changes.

The refractive indexes of the first and second refractive index change layers change differently.

The first voltage and the second voltage are different from each other.

Materials of the first and second refractive index change layers are different from each other.

The first and second refractive index change layers are formed of at least one selected from the group consisting of a photorefractive crystal, a photorefractive polymer, a polymer dispersed liquid crystal (PDLC), and a liquid crystal (LC), respectively.

The first to third electrodes may include metals.

The second electrode may include first and second sub-electrodes that are disposed spaced apart from each other, and an insulating layer disposed between the first sub-electrode and the second sub-electrode.

The refractive index of the first refractive index change layer may change by a voltage applied between the first electrode and the first sub-electrode, and the refractive index of the second refractive index change layer changes by a voltage applied between the second sub-electrode and the third electrode.

The first and second sub-electrodes may include metals.

A distance between the first refractive index change layer and the second refractive index change layer may be equal to or less than 2 µm.

Lengths of the first and second refractive index change layers may be equal to or less than 2 µm.

The active optical device may further include a dielectric layer disposed on the first to third electrodes and the first and second refractive index change layers.

The dielectric layer may include a plurality of dielectric bars that are disposed spaced apart from one another at a predetermined interval.

According to an aspect of another exemplary embodiment, a display apparatus includes a display unit for displaying at least one of a two-dimensional (2D) image and a three-dimensional (3D) image; and the active optical device of claim 1 disposed on the display unit.

The display unit may include at least one of a light source and a display panel.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
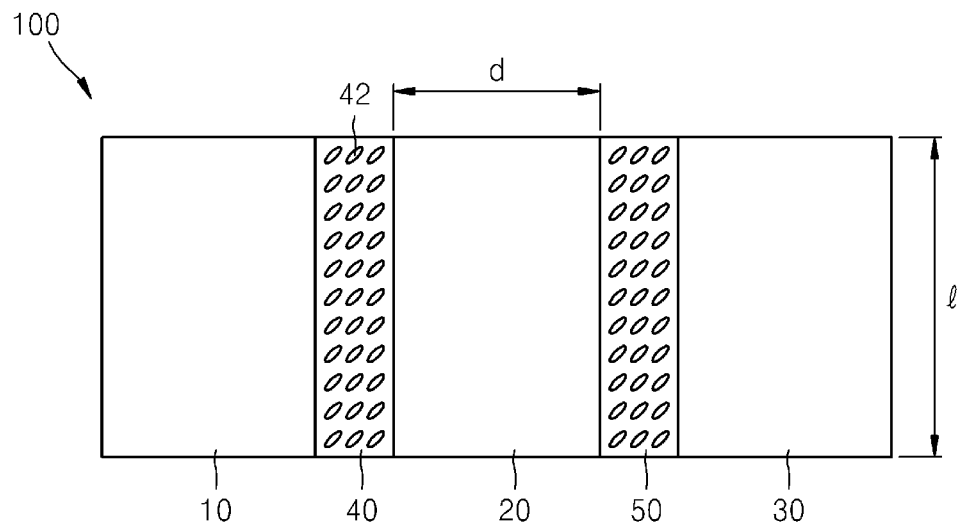
FIG. 1 is a schematic view of an active optical device according to an exemplary embodiment.

Hereinafter, exemplary embodiments will be described in detail with reference to the attached drawings. The same reference numerals in the drawings denote the same element. In the drawings, the thicknesses of layers and regions are exaggerated for clarity.

FIG. 1 is a schematic view of an active optical device 100 according to an exemplary embodiment.

Referring to FIG. 1, the active optical device 100 may include first to third electrodes 10 to 30 that are sequentially disposed and spaced apart from one another, a first refractive index change layer 40 that is disposed between the first electrode 10 and the second electrode 20 and in which a refractive index is changed by an electric field, and a second refractive index change layer 50 that is disposed between the second electrode 20 and the third electrode 30 and in which a refractive index is changed by an electric field.

The first to third electrodes 10 to 30 may be sequentially disposed and spaced apart from one another. Accordingly, a first voltage may be applied to the first and second electrodes 10 and 20, and a second voltage may be applied to the second and third electrodes 20 and 30. The first to third electrodes 10 to 30 may be formed of a metal. The first to third electrodes 10 to 30 may be formed of, for example, Cu, Al, Au, Ag, Cr, Ni, Mo, Ti, Pt, or an alloy thereof. Alternatively, the first to third electrodes 10 to 30 may be formed of the same material or different materials. A metal material has the same potential. Accordingly, the second electrode 20 may block a first electric field formed in the first refractive index change layer 40 and a second electric field formed in the second refractive index change layer 50.

The first refractive index change layer 40 may be disposed between the first electrode 10 and the second electrode 20, and the second refractive index change layer 50 may be disposed between the second electrode 20 and the third electrode 30. The first and second refractive index change layers 40 and 50 may be formed of a material of which a refractive index may vary according to an intensity of an electric field. For example, the first and second refractive index change layers 40 and 50 may be formed of a photorefractive crystal, such as Fe:LiNbO3, Fe:KnbO3, Bi12SiO2O, Bi12GeO2O, or SBN, a photorefractive polymer, a polymer dispersed liquid crystal (PDLC), a liquid crystal (LC), or the like. Alternatively, the first and second refractive index change layers 40 and 50 may be formed of the same material or different materials. In order to apply a hologram, a distance between the first refractive index change layer 40 and the second refractive index change layer 50 may be equal to or less than 2 μm, and lengths 1 of the first and second refractive index change layers 40 and 50 may be equal to or less than 2 μm.

In FIG. 1, the first and second refractive index change layers 40 and 50 are formed of an LC material. Liquid crystal molecules 42 are aligned in a direction of an electric field within the electric field. In general, a refractive index in a long axis of the liquid crystal molecule 42 is different from a refractive index in a short axis thereof, and thus, the liquid crystal molecule 42 has various refractive index distributions according to a state where the liquid crystal molecule 42 is aligned. The liquid crystal molecule 42 may be arranged in a uniform direction, as shown in FIG. 1, when a voltage is not applied between the first electrode 10 and the second electrode 20 and between the second electrode 20 and the third electrode 30, that is, when the active optical device 100 is in an off-state. In this case, the first and second refractive index change layers 40 and 50 may have a uniform refractive index distribution.

Figure 2:
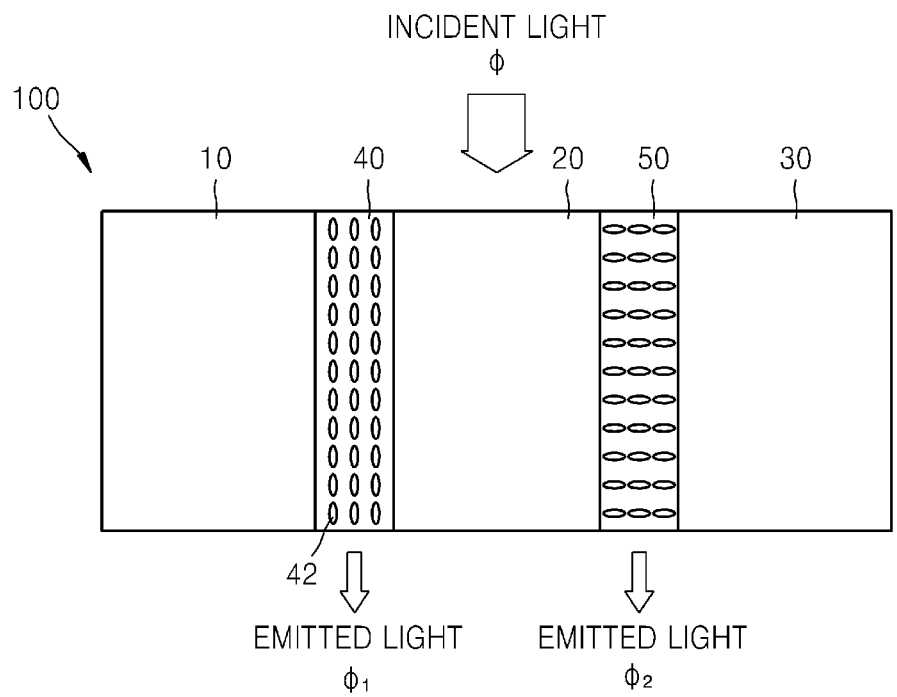
FIG. 2 is a schematic cross-sectional view of the active optical device of FIG. 1 which is in an on-state.

FIG. 2 is a schematic cross-sectional view of the active optical device 100 of FIG. 1 which is in an on-state.

Referring to FIG. 2, if the first voltage is applied between the first electrode 10 and the second electrode 20, a first electric field is formed between the first electrode 10 and the second electrode 20. An arrangement of the liquid crystal molecules 42 of the first refractive index change layer 40 may be changed according to the first electric field, and when the liquid crystal molecules 42 are rearranged, a refractive index of the first refractive index change layer 40 changes. Similarly, if the second voltage is applied between the second electrode 20 and the third electrode 30, a second electric field is formed in the second refractive index change layer 50. An arrangement of the liquid crystal molecules 42 of the second refractive index change layer 50 may be changed according to an intensity of the second electric field, and when the liquid crystal molecules 42 are rearranged, a refractive index of the second refractive index change layer 50 changes. Since the second electrode 20 is formed of a metal, the first electric field does not affect the second refractive index change layer 50, and the second electric field does not affect the first refractive index change layer 40. Accordingly, the first and second refractive index change layers 40 and 50 independently change a phase of incident light.

The first and second refractive index change layers 40 and 50 may differently modulate a phase of incident light. In order to differently modulate a phase of light, refractive indexes of the first and second refractive index change layers 40 and 50 may be different, and thus, intensities of electric fields applied to the first and second refractive index change layers 40 and 50 may be different, or materials of the first and second refractive index change layers 40 and 50 may be different.

In FIGS. 1 and 2, layers formed of LC materials are used as the first and second refractive index change layers 40 and 50. However, exemplary embodiments are not limited thereto, and the first and second refractive index change layers 40 and 50 may be formed of another material of which a refractive index may vary according to an intensity of an electric field.

Figure 3:
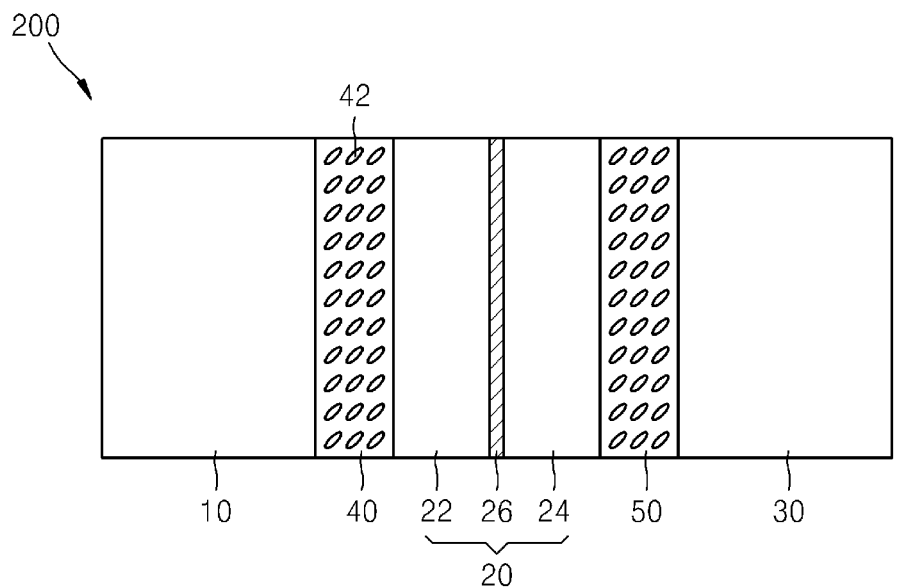
FIG. 3 is a view of an active optical device according to another exemplary embodiment.

The second electrode 20 may be configured as a single layer formed of a metal material, or alternatively, may be configured as a multi-layer structure in which a plurality of metal layers are disposed spaced apart from one another. FIG. 3 is a view of an active optical device 200 according to another exemplary embodiment.

As shown in FIG. 3, the second electrode 20 may include first and second sub-electrodes 22 and 24 that are disposed spaced apart from each other, and an insulating layer 26 disposed between the first and second sub-electrodes 22 and 24. The first sub-electrode 22 and the first electrode 10 may together control a refractive index of the first refractive index change layer 40, and the second sub-electrode 24 and the third electrode 30 may together control a refractive index of the second refractive index change layer 50. The insulating layer 26 prevents an electrical connection between the first and second sub-electrodes 22 and 24. The insulating layer 26 may be formed of an insulating material. In order to block light that is incident on the insulating layer 26, a width of the insulating layer 26 may be smaller than a wavelength of the incident light, or the insulating layer 26 may be formed of a material that absorbs or reflects light. Alternatively, in the insulating layer 26, a surface on which light is incident may be doped with a black insulating material.

When a wavelength of light incident on the active optical device 200 is larger than a width of each of the first and second refractive index change layers 40 and 50, the light does not pass through the first and second refractive index change layers 40 and 50 and is reflected only by the first and second refractive index change layers 40 and 50, thus hardly obtaining phase modulation efficiency. A surface plasmon may be used to increase light efficiency and change a phase of light.

Figure 4:
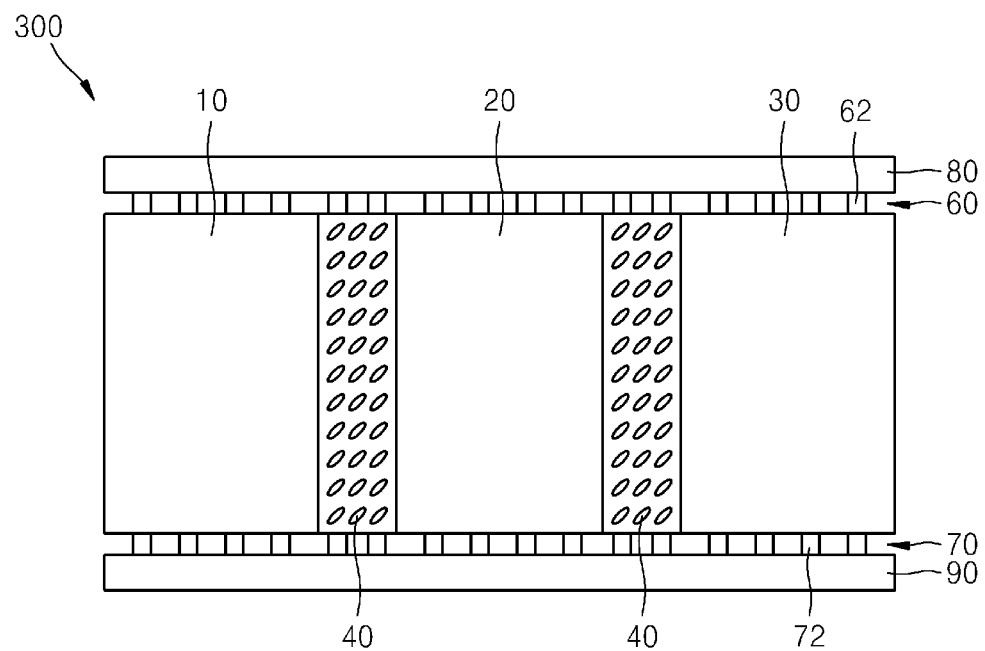
FIG. 4 is a view of an active optical device according to another exemplary embodiment.

FIG. 4 is a view of an active optical device 300 according to another exemplary embodiment.

As shown in FIG. 4, the active optical device 300 may include first to third electrodes 10 to 30 that are sequentially disposed spaced apart from one another, a first refractive index change layer 40 (not shown) that is disposed between the first electrode 10 and the second electrode 20 and in which a refractive index is changed by an electric field, and a second refractive index change layer 50 (not shown) that is disposed between the second electrode 20 and the third electrode 30 and in which a refractive index is changed by an electric field. Also, in the active optical device 300, first and second dielectric layers 60 and 70 may be respectively disposed above and under the first to third electrodes 10 to 30 and the first and second refractive index change layers 40 and 50. Also, the active optical device 300 may further include substrates 80 and 90 that are disposed at outer sides of the first and second dielectric layers 60 and 70, respectively.

The first to third electrodes 10 to 30 may be sequentially disposed spaced apart from each other. Thus, a first voltage may be applied to the first and second electrodes 10 and 20, and a second voltage may be applied to the second and third electrodes 20 and 30. The first to third electrodes 10 to 30 may be formed of a metal, and particularly, a metal that may easily generate a surface plasmon. For example, the first to third electrodes 10 to 30 may be formed of a metal, such as gold (Au), silver (Ag), or aluminum (Al).

The first refractive index change layer 40 may be disposed between the first electrode 10 and the second electrode 20, and the second refractive index change layer 50 may be disposed between the second electrode 20 and the third electrode 30. The first and second refractive index change layers 40 and 50 may be formed of a material of which a refractive index may vary according to an intensity of an electric field. For example, the first and second refractive index change layers 40 and 50 may be formed of a photorefractive crystal, such as Fe:LiNbO3, Fe:KnbO3, Bi12SiO2O, Bi12GeO2O, or SBN, a photorefractive polymer, a PDLC, an LC, or the like. Alternatively, the first and second refractive index change layers 40 and 50 may be formed of the same material or different materials.

The first and second dielectric layers 60 and 70 may be disposed above and under the first to third electrodes 10 to 30 and the first and second refractive index change layers 40 and 50, respectively. When the first and second refractive index change layers 40 and 50 are formed of an LC material, the first and second dielectric layers 60 and 70 may serve as alignment layers. The first and second dielectric layers 60 and 70 may include a plurality of dielectric bars 62 and 72, respectively, that are disposed spaced apart from one another at a predetermined interval.

When a relationship between light, the first dielectric layer 60, and the first to third electrodes 10 to 30 satisfies a condition for generating a surface plasmon, a surface plasmon is generated at an interface between the first dielectric layer 60 and the first to third electrodes 10 to 30. The surface plasmon is a mode of an electro-magnetic field that may progress along an interface between the first dielectric layer 60 and the first to third electrodes 10 to 30 and is referred to as a charge density fluctuation resulting from energy of incident light that has excited free electrons included in the first to third electrodes 10 to 30 that are metals. Such a surface plasmon is a transverse magnetic polarized wave that travels along an interface and has a maximum value at the interface between the first dielectric layer 60 and the first to third electrodes 10 to 30. Light incident on the first to third electrodes 10 to 30 due to generation of the surface plasmon is incident on the first refractive index change layer 40 or the second refractive index change layer 50, thereby changing a refractive index thereof.

The substrates 80 and 90 may be formed of a transparent material, for example, glass or plastic.

Hereinafter, a simulation result of phase modulation of light using the active optical device 100 is described.

First, a distance between the first refractive index change layer 40 and the second refractive index change layer 50 is set to 2 μm, lengths of the first and second refractive index change layers 40 and 50 are set to 2 μm, voltages are applied to the first and second refractive index change layers 40 and 50 to set refractive indexes of the first and second refractive index change layers 40 and 50 to be 1.5 and 1.7, respectively, and light having a wavelength of 600 nm is incident on the active optical device 100. Thus, a phase difference of $2\pi$ is generated between light emitted from the first refractive index change layer 40 and light emitted from the second refractive index change layer 50.

Also, a distance between the first refractive index change layer 40 and the second refractive index change layer 50 is set to 1 μm, lengths of the first and second refractive index change layers 40 and 50 are set to 1 μm, voltages are applied to the first and second refractive index change layers 40 and 50 to set refractive indexes to be 1.5 and 1.7, respectively, and then light having a wavelength of 600 nm is incident on the active optical device 100. Thus, a phase difference of $\pi$ it is generated between light emitted from the first refractive index change layer 40 and light emitted from the second refractive index change layer 50. Accordingly, a change in a phase difference may be controlled according to a distance between refractive index change layers and a length of a refractive index change layer.

Figure 5:
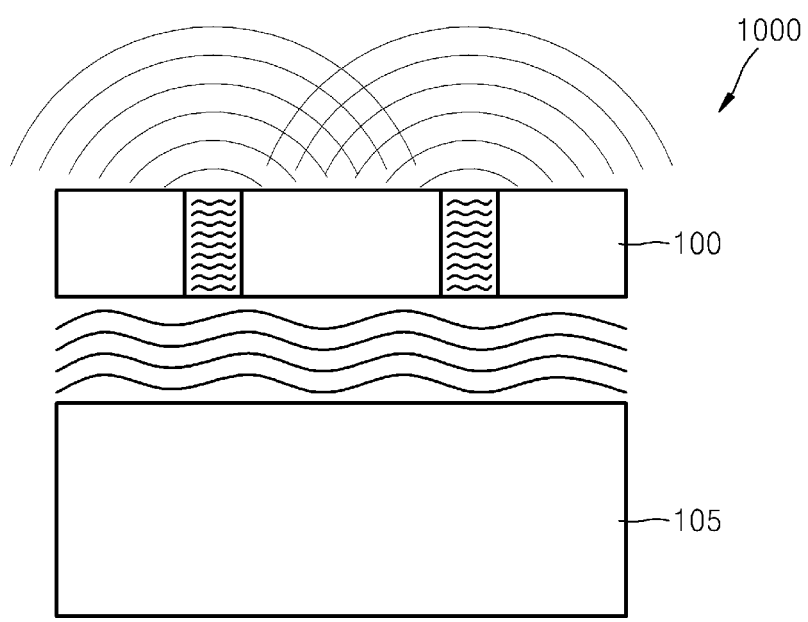
FIG. 5 is a schematic cross-sectional view of a display apparatus including the active optical device of FIG. 1, according to an exemplary embodiment.

The above-described active optical devices 100, 200, and 300 may be applied to a phase modulation apparatus of a display apparatus. FIG. 5 is a schematic cross-sectional view of a display apparatus 1000 including the active optical device 100 of FIG. 1, according to an exemplary embodiment.

Referring to FIG. 5, the display apparatus 1000 may include a display unit 105 for displaying at least one of a two-dimensional (2D) image and a three-dimensional (3D) image, and the active optical device 100 disposed on the display unit 105.

The display unit 105 may display a 2D image or a 3D image, or may display 2D and 3D images at the same time. The display unit 105 may include at least one of a light source and a display panel. Also, the display unit 105 may further include a manual optical device, such as a lens, a mirror, a prism, or the like.

A refractive index of a refractive index change layer included in the active optical device 100 may be controlled according to a magnitude of a voltage applied to electrodes adjacent to the refractive index change layer. Light emitted from the display unit 105 may pass through the active optical device 100. A phase of the light that has passed through the active optical device 100 is changed according to a refractive index of the active optical device 100. The display apparatus 1000 includes the active optical device 100, which may be turned on/off according to application of a voltage, to control light emitted from the display unit 105.

An active optical device according to one or more exemplary embodiments may variously change a phase difference of emitted light even though light having the same phase is incident on the active optical device.

Also, a small-sized active optical device may be realized.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An active optical device comprising:
  a first electrode, a second electrode, and a third electrode that each comprise a metal and are sequentially disposed spaced and are apart from one another;
  a first refractive index change layer disposed between the first electrode and the second electrode, wherein a refractive index of the first refractive index change layer is changed by an electric field applied thereto;
  a second refractive index change layer disposed between the second electrode and the third electrode, wherein a refractive index of the second refractive index change layer is changed by an electric field applied thereto;
  a dielectric layer disposed on the first electrode, the second electrode, and the third electrode, such that light incident on the first electrode, the second electrode, and the third electrode is incident on the first refractive index change layer or the second refractive index change layer due to generation of surface plasmon between the dielectric layer and the first electrode, the second electrode, and the third electrode; and
  wherein the first electrode, the first refractive index change layer, the second electrode, the second refractive change index layer, and the third electrode are sequentially disposed and spaced in a direction normal to an optical path.

2. The active optical device of claim 1, wherein when a first voltage is applied between the first electrode and the second electrode, the refractive index of the first refractive index change layer changes, and when a second voltage is applied between the second electrode and the third electrode, the refractive index of the second refractive index change layer changes.

3. The active optical device of claim 2, wherein the refractive indexes of the first and second refractive index change layers change differently.

4. The active optical device of claim 3, wherein the first voltage and the second voltage are different from each other.

5. The active optical device of claim 3, wherein a material of the first refractive index change layer is different from a material of the second refractive index change layer.

6. The active optical device of claim 1, wherein each of the first refractive index change layer and the second refractive index change layer are formed of at least one material selected from a group consisting of a photorefractive crystal, a photorefractive polymer, a polymer dispersed liquid crystal, and a liquid crystal.

7. The active optical device of claim 1, wherein the second electrode comprises a first sub-electrode and a second sub-electrode, and an insulating layer disposed between the first sub-electrode and the second sub-electrode.

8. The active optical device of claim 7, wherein the refractive index of the first refractive index change layer changes according to a voltage applied between the first electrode and the first sub-electrode, and the refractive index of the second refractive index change layer changes according to a voltage applied between the second sub-electrode and the third electrode.

9. The active optical device of claim 7, wherein the first sub-electrode and the second sub-electrode each comprise a metal.

10. The active optical device of claim 1, wherein a distance between the first refractive index change layer and the second refractive index change layer is equal to or less than 2 μm.

11. The active optical device of claim 1, wherein a length of the first refractive index change layer is equal to or less than 2 μm and a length of the second refractive index change layer is equal to or less than 2 μm.

12. The active optical device of claim 1 wherein the dielectric layer is further disposed on the first refractive index change layer and the second refractive index change layer.

13. The active optical device of claim 1, wherein the dielectric layer comprises a plurality of dielectric bars that are disposed spaced apart from one another at predetermined intervals.

14. A display apparatus comprising:
  a display unit for displaying at least one of a two-dimensional image and a three-dimensional image; and
  the active optical device of claim 1 disposed on the display unit.

15. The display apparatus of claim 14, wherein the display unit comprises at least one of a light source and a display panel.

16. An active optical device comprising:
  a first electrode, a first refractive index change layer, a second electrode, a second refractive index change layer, and a third electrode, sequentially disposed and spaced in a direction normal to an optical path; and
  a dielectric layer disposed on the first electrode, the second electrode, and the third electrode, such that light incident on the first electrode, the second electrode, and the third electrode is incident on the first refractive index change layer or the second refractive index change layer due to generation of surface plasmon between the dielectric layer and the first electrode, the second electrode, and the third electrode;
  wherein a refractive index of the first refractive index change layer is changeable based on a voltage applied between the first electrode and the second electrode;
  wherein a refractive index of the second refractive index change layer is changeable based on a voltage applied between the second electrode and the third electrode, and wherein each of the first electrode, the second electrode, and the third electrode comprise a metal.

* * * * *